(No Model.)
T. B. CULTRA.
VEHICLE POLE.
No. 486,857. Patented Nov. 29, 1892.
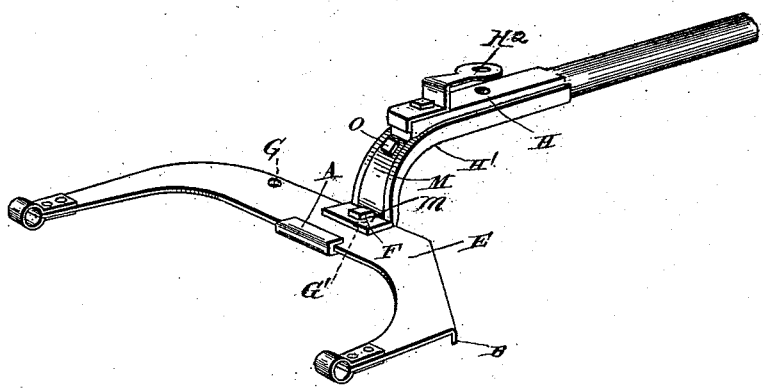
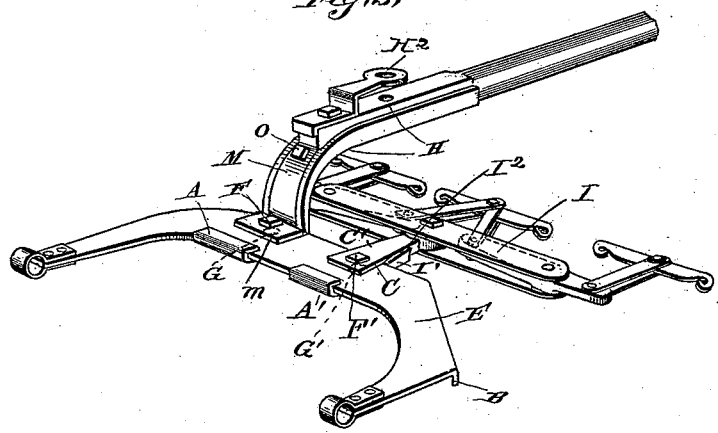
Witnesses:
Isaac Amerman
John L. Myler
Thomas Blain Cultra Inventor

United States Patent Office.

THOMAS BLAIN CULTRA, OF OMAHA, NEBRASKA.

VEHICLE-POLE.

SPECIFICATION forming part of Letters Patent No. 486,857, dated November 29, 1892.

Application filed December 7, 1891. Serial No. 414,311. (No model.)

*To all whom it may concern:*

Be it known that I, THOMAS BLAIN CULTRA, of Omaha, in the county of Douglas and State of Nebraska, have invented a new and useful Improvement in Tongues, of which the following is a specification.

My invention is an improved draft device, having for an object to provide a simple economical construction which may be conveniently adjusted for two or three horses abreast and in which the center draft will be preserved whether two or three horses be employed.

The invention consists in certain features of construction and combinations of parts, as will be hereinafter described and claimed.

In the drawings, Figure 1 is a perspective view of the device with the pole adjusted for a two-horse team, and Fig. 2 is a similar view with the parts adjusted for three horses abreast.

The circle or plate E is preferably made of steel and with the side arms pivoted at their rear ends to the axle, and the transverse portion connecting the front ends of said arms and arranged approximately at right angles to the line of draft. This plate E may be braced by bending or flanging its edges, as shown at B.

The pole H is held to and adjustable along the transverse portion of the plate E, so it may be set centrally for a two-horse team or to one side of the center for a three-horse team, as will presently be described. To this end the pole is provided with a coupling portion embracing the transverse portion of the plate E and comprising irons H' and M. The iron H' is formed at its front end for connection with the pole proper H, usually by providing a socket-like seat for such pole, and the said iron H' extends down and rearwardly under the plate E and is provided at its rear end with a lip A, bent up over the rear edge of the transverse portion of the circle or plate. The iron M is bolted at O to the upper side of the iron H' and is provided with a portion $m$, lapped upon the upper front edge of the plate E, such parts A and $m$ serving to embrace the transverse portion of the circle, as shown. The bolt F passes through the parts $m$, H', and the circle and forms the fastening device. The three-horse evener I is secured to the plate E by a coupling I², having plates I' C', provided, respectively, with portions A' C, lapping upon the rear and front edges of the circle-plate in similar manner to portions A and $m$, previously described, the connection I² being secured to the plate E by bolt F', as shown. The plate E is provided with bolt-holes G' G, the former at the center and the latter to one side of the center, as shown.

The arrangement for two horses is shown in Fig. 1, the pole having a clip H² to facilitate the connection of the doubletree. In this arrangement the pole is in the center of the draft and the horses walk one on each side. In Fig. 2 the pole is arranged to the left of the center and the horses walk one on the left and two on the right of the pole, and the draft is exerted centrally. Manifestly, if desired, the plate E may be inverted and the parts H and I² be applied, so that the animals will be arranged one to the right and two to the left of the pole.

Having thus described my invention, what I claim as new, and desire to secure by Letters Patent, is—

1. In a draft device, substantially as described, the combination of the circle or plate provided centrally and to one side of its center with points for the attachment of the pole and the pole detachably connected with said circle or plate, whereby it may be applied centrally thereto for a two-horse team or to one side of the center for a three-horse team, substantially as set forth.

2. An improved device, substantially as described, comprising the pole, the circle adapted at its center and to one side of its center to receive such pole, and fastening devices whereby said pole may be detachably secured to the plate at its center or to one side thereof, all substantially as and for the purposes set forth.

3. In a draft device, substantially as described, the combination, with a plate or frame, of the tongue provided with portions held to said plate or frame and adjustable laterally thereon, whereby the pole may be set centrally of the frame for a two-horse team or to one side of such center for a three-horse team, and fastening devices, all substantially as set forth.

4. In a draft device, substantially as described, the combination of the circle or plate provided with a transverse portion arranged approximately at right angles to the line of draft and the pole adjustable upon said transverse portion, whereby it may be set centrally or to one side of the center thereof, all substantially as set forth.

5. The improved draft device, substantially as herein described and shown, consisting of the circle or plate, the pole held to said plate and provided with a seat for the doubletree, and the three-horse evener, all substantially as set forth.

6. The draft device, substantially as herein described, consisting of the circle or plate provided at its center and to one side of its center with bolt-holes, the pole, the three-horse evener, and bolts passed through the holes in the circle or plate and securing the pole and evener thereto, all substantially as and for the purposes set forth.

7. In a draft device, the combination, with the circle or plate E, of the pole having irons H' and M, lapped at A and $m$ upon the opposite edges of and securing the pole to the said plate, substantially as set forth.

8. The combination, in draft devices, substantially as described, consisting of the plate E, having bolt-holes G G', arranged one on the center and the other to one side thereof, the pole having its coupling formed with plates, having lapped portions A and $m$, the three-horse evener having its coupling formed with plates having lapped portions A' and C, and the bolts F F', all substantially as and for the purposes set forth.

THOMAS BLAIN CULTRA.

Witnesses:
RICHARD HEMALA,
DAVID A. STITT.